Jan. 12, 1960     T. CAMPAGNOLO     2,920,911
SADDLE SUPPORTS FOR BICYCLES AND LIKE VEHICLES
Filed April 10, 1956     2 Sheets-Sheet 2
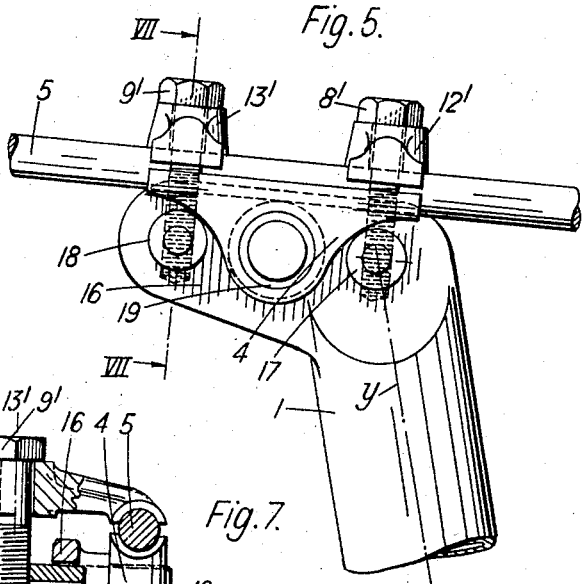
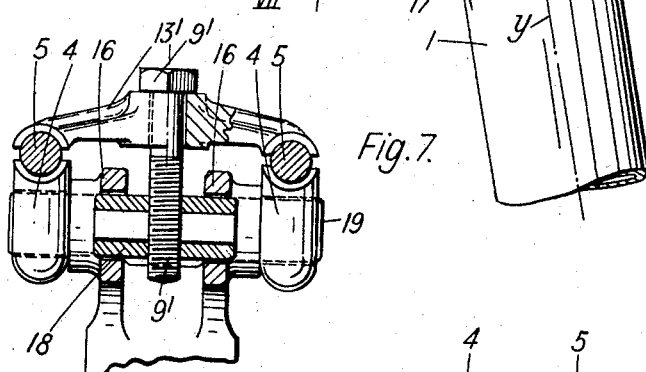
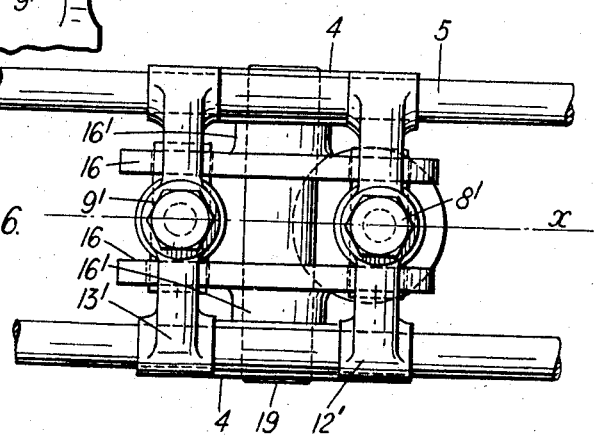
Inventor,
Tullio Campagnolo

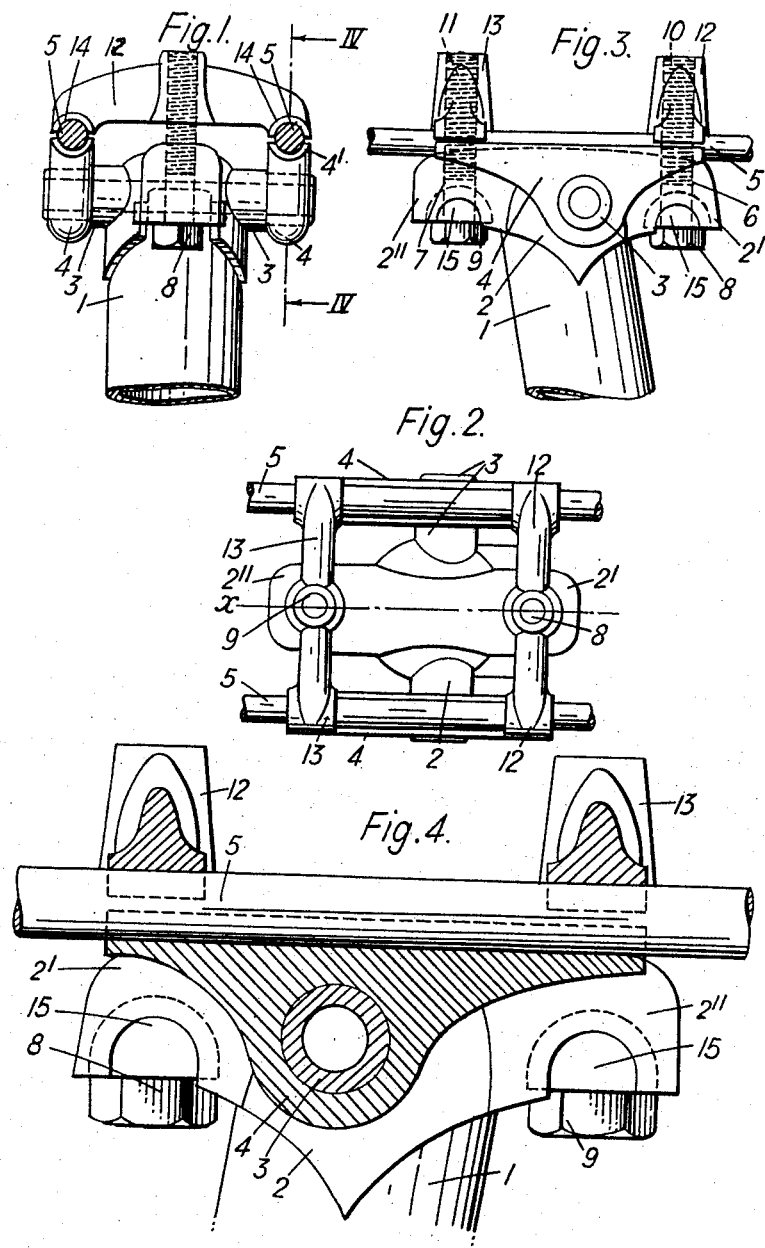

United States Patent Office 2,920,911
Patented Jan. 12, 1960

2,920,911

SADDLE SUPPORTS FOR BICYCLES AND LIKE VEHICLES

Tullio Campagnolo, Vicenza, Italy

Application April 10, 1956, Serial No. 577,304

Claims priority, application Italy April 12, 1955

9 Claims. (Cl. 287—14)

The present invention relates to saddle supports for bicycles and like vehicles.

According to the present invention a saddle support for a bicycle or like vehicle comprises a tubular element adapted to engage a corresponding tubular element of the vehicle frame and to be held fast thereto by means known per se, the first-mentioned tubular element being provided at its upper end with a head formed with two arms for supporting the two bars of the saddle framework, the two arms being adapted to be turned about a common transverse axis, two cross members adapted to lock the said bars against the said arms and mounted on the said head for pivotal movement about axes parallel to the transverse axis of the arms, one of the cross-members being located in front of and the other behind the said transverse axis, and means for adjusting the distance of the said cross members from their axes of rotation for the purpose of adjusting the inclination of the saddle.

Some embodiments of the invention will now be described by way of example with reference to the accompanying drawings, in which:

Figures 1, 2 and 3 are end elevation, plan view and side elevation respectively of one embodiment of the invention.

Figure 4 is a side elevation of the embodiment shown in Figures 1–3, drawn to a larger scale and partly in section, the section being taken on the line IV—IV in Figure 1.

Figures 5, 6 and 7 are side elevation, plan view and end elevation respectively of a second embodiment of the invention, the end elevation being partly in section taken on the line VII—VII of Figure 5.

In the first embodiment illustrated in Figures 1 to 4 a tubular element 1 is adapted to be introduced into a tube (not shown) of a bicycle frame and held fast therein in known manner. The said tubular element 1 is terminated at its upper end by a widened head 2 inclined in relation to the tubular element 1 so that the head 2 remains substantially horizontal when the tubular element 1 is introduced into the bicycle frame.

The said head 2 comprises two hollow gudgeons 3 projecting on either side thereof in a direction perpendicular to the longitudinal axis $x$ of the saddle. Mounted so as to pivot freely on the said gudgeons 3 are two arms 4 provided at the upper end thereof with recesses 4' which house the lower sides of the two normally parallel spaced bars 5 forming the framework of the saddle.

The head 2 also has two projections 2' and 2'' at the front and rear respectively, formed with vertical holes 6 and 7, through which there extend headed screws 8 and 9, the screwthreaded ends of which engage in screwthreaded holes 10 and 11 respectively in cross members 12 and 13 which, in turn, are formed with recesses 14 engaging the bars 5. The said cross members 12 and 13 may thus be locked against the upper sides of the bars 5 by means of screws 8 and 9.

Thus, the bars 5 and consequently the saddle are rigidly fixed to the head 2 of the tubular element 1 and consequently to the frame of the vehicle. Thus, despite the fact that the bars 5 rest on the arms 4, any oscillation of the said arms is prevented by the tightening of the screws 8 and 9 situated on either side of the gudgeons 3 in the cross members 12 and 13, which are in turn assembled with the head 2 without any possibility of play.

When it is desired to vary the inclination of the saddle, the front screw 8 or the rear screw 9 is slackened, depending upon whether it is desired to incline the saddle to the rear or to the front, whereafter the other screw 8 or 9 is similarly tightened, the arms 4 being rocked in one direction or the other until the two screws remain in tension. This adjustment of the inclination of the saddle may be effected to any desired value, even to very small amounts, since the screws 8 and 9 may be tightened or slackened by a fraction of a turn.

To facilitate this adjustment and to obviate all danger of damage to the locking means due to faulty positioning, the heads of the screws 8 and 9 bear on the projections 2' and 2'' respectively on the head 2 through semi-cylindrical washers 15 lodged in recesses of corresponding shape in the lower ends of the said projections. Thus, regardless of the inclination of the bars 5, the screws 8 and 9 are always perpendicular to the bars, so that the locking forces are always directed along the axis of the screws. The device described ensures that the bars 5 bear extensively and regularly on the respective arms regardless of the inclination of the saddle.

The same advantages are obtained with the constructional form illustrated in Figures 5 to 7, which affords in addition better balancing than is possible in ordinary saddles, by reason of the fact that the axis of the arms is situated well to the rear of the axis $y$ of the tubular element of the support. Owing to this arrangement, the head of the support takes the form of two lugs 16 projecting in parallel relationship from the rear side of the tubular element 1 so as to enclose between them the two headed screws 8' and 9' by which the bars 5 of the saddle are secured. Instead of being screwed into the cross members 12' and 13', the said screws in this form of construction are screwed into cylindrical nuts 17, 18 rotatably mounted in recesses of corresponding shape in the lugs 16 and formed with screwthreaded diametral holes, in which the screwthreaded ends of the screws 8' and 9' are engaged. The two cross members 12' and 13' are in this case formed with holes, through which the bodies of the headed screws 8' and 9' freely extend. The gudgeons supporting the arms 4 consist fo the ends of a hollow shaft 19 supported by bosses 16' of the lugs 16 and projecting from the opposite sides of the said bosses.

As will readily be appreciated from Figure 5, if it is desired, for example, to incline the saddle in the rearward direction, so as to lower the left-hand end thereof (as seen in the drawing) and to raise the right-hand end, the screw 8' is slackened so that the cross member 12' can be lifted to enable the saddle to be inclined by pivoting with the arms 4 about the axis of the shaft 19. The saddle is secured in its new position by tightening the screw 9', whereby the cross member 13' is lowered until it is again positioned against the bars 5 in their new position.

The latter form of construction facilitates the subsequent mounting and removal of the saddle, it being sufficient to unscrew completely the headed screws 8' and 9' of the nuts 17 and 18 respectively to free the bars 5 and consequently the saddle, which can then be removed with the cross members 12' and 13'. At the same time, the nuts 17 and 18 are freed and can be removed from the lugs 16 with the shaft 19, the head of the support being left completely bare.

It will be understood that modifications and improvements may be made in the elements thereof, and that the aforesaid elements may be combined in various ways, provided that the essential principle thereof is maintained, the said principle consisting in providing saddle-supporting elements in the form of arms so as to enable the saddle to pivot about a transverse axis and in locking the said saddle at at least two points, one in front of and the other behind the point about which it pivots, so that the inclination of the said saddle can be regulated, without departing from the scope of the invention.

What I claim is:

1. A saddle support for a bicycle or like vehicle, the support comprising a first tubular element adapted to engage a second mating tubular element of the vehicle frame and to be fastened thereto by locking means, a head portion being formed at the upper end of said first tubular element, two arms pivotally supported on said head portion, said two arms being adapted to support two bars of the saddle framework, so that said two arms and two bars are pivotally supported on a common transverse axis, and a plurality of transverse adjusting and fastening members operatively connecting said saddle framework to said head portion adapted to adjust the inclination of said saddle framework with respect to said transverse axis, at least one of said plurality of fastening and adjusting members being located in front and at least one behind said common transverse axis.

2. A saddle support according to claim 1, wherein said plurality of transverse combination adjusting and fastening members includes two cross members and means for mounting said cross members to the head of said first tubular element for pivotal movement about axes parallel to the transverse axis of said supporting arms, one of the cross members being located in front of and the other behind the said transverse axis.

3. A saddle support according to claim 2 wherein the cross members for locking the bars forming the framework of the saddle against the bar supporting arms are mounted on the head of the tubular element by means of a system of screws, each cross member being formed with a central screw-threaded hole into which is screwed the screw-threaded end of one of the screws for adjusting and fixing the inclination of the saddle and the said screws bearing by means of their heads on the lower faces of two projections, one in front of and the other behind the head of the tubular element, through semi-cylindrical washers mounted in recesses of corresponding shape in the said projections.

4. A saddle support according to claim 2 wherein means for mounting said cross members includes a system of screws, each cross member being formed with a central hole through which there freely passes the body of one of the screws for adjusting and fixing the inclination of the saddle and the said screws engaging with their screwthreaded ends in screwthreaded diametral holes in cylindrical nuts rotatably mounted in recesses of corresponding shape in the head of the tubular element.

5. A saddle support according to claim 4, wherein the head of the tubular element is formed by two lugs projecting parallel to one another from the tubular element in a rearward direction and enclosing between them the system of screws for adjusting and fixing the inclination of the saddle.

6. A saddle support according to claim 2, wherein the supporting arms and the cross members are formed with recesses which house the lower and upper portions respectively of the bars, which are disposed substantially parallel to one another.

7. A saddle support according to claim 1, wherein the two framework arms for supporting the bars are mounted so as to pivot freely on coaxial gudgeons which project laterally from each side of the head of said first tubular element.

8. A saddle support for a bicycle or like vehicle, the support comprising a first tubular element adapted to engage a second mating tubular element of the vehicle frame and to be fastened thereto by locking means, a head portion being formed at the upper end of said first tubular element, at least one arm pivotally mounted on said head portion, said arm being adapted to support at least one bar of the saddle framework so that said arm and bar are pivotally supported on a common transverse axis, and a plurality of transverse adjusting and fastening members operatively connecting said saddle framework to said head portion adapted to adjust the inclination of said saddle framework with respect to said transverse axis, at least one of said plurality of fastening and adjusting members being located in front and at least one behind said common transverse axis.

9. A saddle support according to claim 8, wherein the head of the tubular element and the members secured thereto are so disposed as to lie substantially in a plane inclined to the axis of the tubular element in such a manner that the said head of the tubular element is substantially horizontal when the aforesaid tubular element is introduced into the tubular element of the frame of the vehicle.

References Cited in the file of this patent

UNITED STATES PATENTS

| 405,780 | Knous | June 25, 1889 |
| 582,607 | Seely | May 11, 1897 |
| 584,984 | Byrnes | June 22, 1897 |
| 587,711 | Decker | Aug. 10, 1897 |

FOREIGN PATENTS

| 727 | Great Britain | Jan. 10, 1902 |
| 16,112 | Great Britain | June 26, 1897 |
| 1,000,423 | France | Oct. 10, 1951 |